United States Patent
Moroze

(10) Patent No.: US 9,146,916 B2
(45) Date of Patent: Sep. 29, 2015

(54) TRANSFORMING DATA TABLES INTO MULTI-DIMENSIONAL PROJECTIONS WITH AGGREGATIONS

(75) Inventor: Benjamin L. Moroze, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1108 days.

(21) Appl. No.: 12/686,792

(22) Filed: Jan. 13, 2010

(65) Prior Publication Data

US 2011/0107254 A1 May 5, 2011

Related U.S. Application Data

(60) Provisional application No. 61/256,418, filed on Oct. 30, 2009.

(51) Int. Cl.
*G06F 17/00* (2006.01)
*G06F 17/24* (2006.01)

(52) U.S. Cl.
CPC ............ *G06F 17/245* (2013.01); *G06F 17/246* (2013.01)

(58) Field of Classification Search
CPC .............................. G06F 17/246; G06F 17/245
USPC ................... 715/212, 215, 217, 214
See application file for complete search history.

(56) References Cited

U.S. PATENT DOCUMENTS

| | | | |
|---|---|---|---|
| 5,809,495 A * | 9/1998 | Loaiza | 1/1 |
| 6,626,959 B1 * | 9/2003 | Moise et al. | 715/210 |
| 7,818,661 B2 * | 10/2010 | Patel | 715/212 |
| 2004/0049505 A1 * | 3/2004 | Pennock | 707/5 |
| 2005/0262110 A1 * | 11/2005 | Gu et al. | 707/100 |
| 2006/0116989 A1 * | 6/2006 | Bellamkonda et al. | 707/3 |
| 2007/0002869 A1 * | 1/2007 | Miller | 370/395.32 |
| 2007/0061344 A1 * | 3/2007 | Dickerman et al. | 707/100 |
| 2007/0061746 A1 * | 3/2007 | Folting et al. | 715/764 |
| 2007/0260578 A1 * | 11/2007 | Ghosh | 707/2 |
| 2008/0103876 A1 * | 5/2008 | Armstrong et al. | 705/10 |
| 2008/0162554 A1 * | 7/2008 | Martino et al. | 707/103 Y |
| 2009/0282324 A1 * | 11/2009 | Patel | 715/212 |
| 2010/0205521 A1 * | 8/2010 | Folting | 715/227 |
| 2011/0072340 A1 * | 3/2011 | Miller et al. | 715/220 |
| 2012/0159297 A1 * | 6/2012 | Peters | 715/212 |

OTHER PUBLICATIONS

Lucas, Jellema, ADF Faces 11g: Reloading the Matrix—Using the Pivot Table Component, Nov. 2007, Amis Technology Blog.*

(Continued)

*Primary Examiner* — Scott Baderman
*Assistant Examiner* — Howard Cortes
(74) *Attorney, Agent, or Firm* — Miles & Stockbridge PC

(57) ABSTRACT

A data table transformer includes a data receiving module configured to receive a set of rows, each row with a set of attributes, as input data. The data receiving module is also configured to receive locations for at least some of the attributes as zero-based edges. Layers of the edge are presented from the slowest to the fastest varying layers. The data receiving module is further configured to receive a designation of data values that appear at intersections of edge attributes from the same row. The data table transformer is also configured to walk input data by row and for each edge attribute, to distribute the value of the edge attribute to an edge tree created for each zero-based edge location. The data table transformer is further configured to display the data with a multi-dimensional, crosstabular display.

19 Claims, 4 Drawing Sheets

(56) References Cited

OTHER PUBLICATIONS

Convert Delimited Text to Columns, Microsoft Excel 2003 Misc., Jul. 2008, Envision Programing, tipsforspreadsheets.com.*

Lucas Jellema, ADF 11g RichFaces—A closer look at the Pivot Table Data Visualization component, Oct. 15, 2008, AMIS technology Blog, pp. 1-16 Retrived: http://technology.amis.nl/2008/10/15/adf-11g-richfaces-a-closer-look-at-the-pivot-table-data-visualization-component/.*

Peter Kupfer etal, Calc Guide, Chapter 6 Data Pilot: Creating order from chaos, Published Mar. 4, 2007, pp. 1-15.*

Oracle Application Development Framework Overview; Oracle White Paper; Jul. 2009; pp. 1-10.

Wikipedia; Pivot Table; http://en.wikipedia.org/w/index.php?title=Pivot_table&printable=yes; Dec. 9, 2009.

* cited by examiner

Fig. 2

Filters

Direct ▼

|  |  | World | | Boston | | Total Geography | |
|---|---|---|---|---|---|---|---|
|  |  | Sales | Units | Sales | Units | Sales | Units |
| △ 2005 |  | 8750 | 35 | 500 | 9 | 9250 | 44 |
| ▽ 2006 |  | 17500 | 70 | 1000 | 15 | 18500 | 85 |
|  | Tents | 10000 | 100 | 250 | 25 | 10250 | 125 |
|  | Canoes | 7500 | 40 | 750 | 4 | 8250 | 44 |
| ▽ 2007 |  | 15000 | 28 | 900 | 11 | 15900 | 39 |
|  | Canoes | 10000 | 50 | 500 | 2 | 10500 | 52 |
|  | Tents | 5000 | 5 | 400 | 20 | 5400 | 25 |
| Total Across Years |  | 41250 | 265 | 2400 | 68 | 43650 | 333 |

Fig. 3

| Year | Product | Channel | Geography | Sales | Units |
|---|---|---|---|---|---|
| 2007 | Tents | Direct | World | 5000 | 5 |
| 2007 | Tents | Indirect | World | 20000 | 200 |
| 2007 | Tents | Direct | Boston | 400 | 20 |
| 2007 | Tents | Indirect | Boston | 100 | 50 |
| 2007 | Canoes | Direct | World | 10000 | 50 |
| 2007 | Canoes | Direct | Boston | 500 | 2 |
| 2007 | Canoes | Indirect | World | 15000 | 75 |
| 2007 | Canoes | Indirect | Boston | 1500 | 8 |
| 2006 | Tents | Direct | World | 10000 | 100 |
| 2006 | Tents | Direct | Boston | 250 | 25 |
| 2006 | Tents | Indirect | World | 20000 | 200 |
| 2006 | Tents | Indirect | Boston | 500 | 50 |
| 2006 | Canoes | Direct | World | 7500 | 40 |
| 2006 | Canoes | Direct | Boston | 750 | 4 |
| 2006 | Canoes | Indirect | World | 15000 | 80 |
| 2006 | Canoes | Indirect | Boston | 150 | 8 |
| 2005 | Tents | Direct | World | 5000 | 50 |

310 — Year
320 — Product
330 — Channel
340 — Geography
350 — Sales
360 — Units
300

TRANSFORMING DATA TABLES INTO MULTI-DIMENSIONAL PROJECTIONS WITH AGGREGATIONS

This nonprovisional application claims the benefit of U.S. Provisional Application No.61/256,418, filed Oct.30, 2009, the disclosure of which is hereby incorporated by reference.

FIELD

One embodiment is directed generally to computer systems, and in particular to data display and aggregation in a computer system.

BACKGROUND

Relational data may be displayed in tables as a set of rows and columns. For instance, the columns "Sales" and "Units" may have row values for a series of months. Calculations such as aggregates may be performed by a database application and presented by a software application with a Graphical User Interface ("GUI").

SUMMARY

In some embodiments, a data table transformer includes a data receiving module configured to receive a set of rows, each row with a set of attributes, as input data. The data receiving module is also configured to receive locations for at least some of the attributes as zero-based edges. Layers of the edge are presented from the slowest to the fastest varying layers. The data receiving module is further configured to receive a designation of data values that appear at intersections of edge attributes from the same row. The data table transformer is also configured to walk input data by row and for each edge attribute, and to distribute the value of the edge attribute to an edge tree created for each zero-based edge location. The data table transformer is further configured to display the data with a multi-dimensional, cross-tabular display.

BRIEF DESCRIPTION OF THE DRAWINGS

In order that the embodiments of the invention will be readily understood, a more particular description of the invention briefly described above will be rendered by reference to specific embodiments that are illustrated in the appended drawings. While it should be understood that these drawings illustrate only typical embodiments of the invention and are not therefore to be considered to be limiting of its scope, the invention will be described and explained with additional specificity and detail through the use of the accompanying drawings, in which:

FIG. 2 is a screenshot of a GUI displaying a pivot table according to an embodiment of the present invention.

FIG. 3 is a screenshot of comma separated value ("CSV") file data according to an embodiment of the present invention.

DETAILED DESCRIPTION

In some embodiments, a data table transformer may prepare table data to be presented in a multi-dimensional, or cross-tabular, format. "Cross-tabular" means that the joint distribution of two or more attributes is displayed. A data receiving module of the data table transformer receives a set of rows, where each row has a set of attributes, as input data. The data receiving module is also configured to receive locations for at least some of the attributes as zero-based edges, where layers of the edges are presented from the slowest to the fastest varying layers. The data receiving module is further configured to receive a designation of data values that appear at intersections of edge attributes from the same row. The data table transformer is also configured to walk input data by row and for each edge attribute, and to distribute the value of the edge attribute to an edge tree created for each zero-based edge location. The data is then displayed by the data table transformer or a consuming application with a multi-dimensional, cross-tabular display. Rows and columns of data in this format may have "layers" that can be expanded and collapsed, based on the GUI, to "drill down" to view more detailed layers. Such an implementation may allow a user application, rather than a server-side or database application, to choose which data to present and how the data should be presented to the user.

Figure 1:
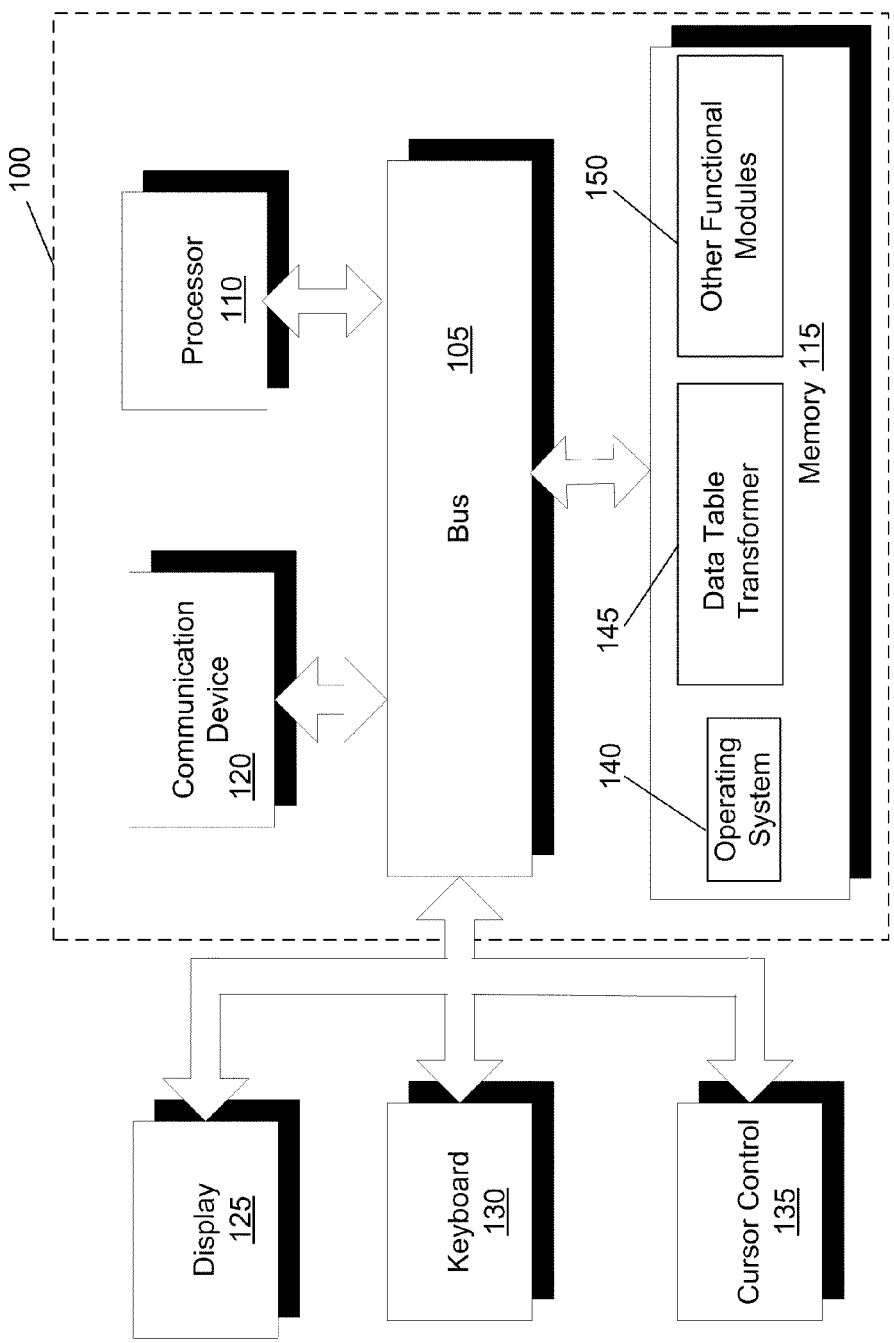
FIG. 1 is a block diagram illustrating a computer having a data table transformer that can implement an embodiment of the present invention.

FIG. 1 is a block diagram of a computer 100 that can implement an embodiment of the present invention. Computer 100 includes a bus 105 or other communication mechanism for communicating information, and a processor 110 coupled to bus 105 for processing information. Processor 110 may be any type of general or specific purpose processor, including a central processing unit ("CPU") or application specific integrated circuit ("ASIC"). Computer 100 further includes a memory 115 for storing information and instructions to be executed by processor 110. Memory 115 can be comprised of any combination of random access memory ("RAM"), read only memory ("ROM"), flash memory, cache, static storage such as a magnetic or optical disk, or any other types of computer readable media or combination thereof. Additionally, computer 100 includes a communication device 120, such as a network interface card, to provide access to a network. Therefore, a user may interface with computer 100 directly, or remotely through a network or any other method.

Computer readable media may be any available media that can be accessed by processor 110 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 110 is further coupled via bus 105 to a display 125, such as a Liquid Crystal Display ("LCD"), for displaying information to a user, such as status information. A keyboard 130 and a cursor control device 135, such as a computer mouse, is further coupled to bus 105 to enable a user to interface with computer 100.

In one embodiment, memory 115 stores software modules that provide functionality when executed by processor 110. The modules include an operating system 140 that provides operating system functionality for computer 100. The modules further include a data table transformer 145 that is configured to facilitate debugging. Computer 100 can be part of a larger system such as a cluster computing system, a distributed computing system, a cloud computing system, a "server farm" or any other system having multiple servers and/or computing devices. Computer 100 will typically include one or more additional functional modules 150 to include additional functionality. In some embodiments, data table transformer 145 may be part of operating system 140 or part of one or more other functional modules included in other functional modules 150, such as a consuming application that graphically displays table data.

It should be noted that many of the functional features described in this specification have been presented as modules in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be at least partially implemented in software for execution by various types of processors. An identified unit of executable code in a software module may, for instance, comprise one or more physical or logical blocks of computer instructions which may, for instance, be organized as an object, procedure or function. Nevertheless, the executables of an identified module need not be physically located together, but may comprise disparate instructions stored in different locations that, when joined logically together, comprise the module and achieve the stated purpose for the module. Modules may be stored on a computer-readable medium, which may be, for instance, a hard disk drive, a flash device, random access memory ("RAM"), a tape drive, an optical drive, a compact disk having read-only memory ("CD-ROM") or a digital video disk having read-only memory ("DVD-ROM"), or any other such medium used to store data. The medium may be read-only or read/write.

Indeed, a unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

FIG. 2 is a screenshot 200 of a GUI displaying an Oracle Application Development Framework ("ADF") pivot table according to an embodiment of the present invention. The ADF pivot table displays a grid of multi-dimensional data with rows and columns and optionally, a pivot filter bar to filter data not displayed in the rows and columns (in this case, filtering between "direct" and "indirect" sales data). The data may be provided by a relational database, for example, and the data can include aggregations across an entire relational data set or across groups of like attributes in the relational data set. In one embodiment, the ADF pivot table is developed using Oracle JDeveloper.

As an example of a relational data set, the first input may be as follows in Table 1 below:

TABLE 1

| Attr1 | Attr2 | Attr3 | Val1 | Val2 |
|-------|-------|-------|------|------|
| B | X | M | 3 | 4 |
| A | Y | M | 5 | 6 |
| A | X | M | 1 | 2 |
| B | Y | M | 7 | 8 |

The second input may include locations and roles for the relational data set's attributes and may be as follows:

(1) Make Attr2 and Attr1 available on a "down", or "row", axis;
(2) Make Attr3 and data values available on an "across", or "column", axis;
(3) Data values are Val1, Val2; and
(4) Show aggregations of Val1 and Val2 for each Attr2.

The desired result, which may be made available through an Application Programming Interface ("API"), may describe the data as well as the format as follows in Table 2 below:

TABLE 2

|  |  | M Val1 | M Val2 |
|---|---|---|---|
| X | B | 3 | 4 |
| X | A | 1 | 2 |
| Agg. | X | 4 | 6 |
| Y | A | 5 | 6 |
| Y | B | 7 | 8 |
| Agg. | Y | 12 | 14 |

Returning to FIG. 2, which is a graphical display of data in accordance with the principles discussed above, column edge 210 is the horizontal axis above the pivot table containing one or more layers of information in the pivot table. Row edge 220 is the vertical axis left of the pivot table containing one or more layers of information in the pivot table. Page edge 230 is the optional pivot filter bar containing zero or more layers of information for filtering the display of data in the pivot table. Data body 240 contains one or more measures, or data values, displayed in the cells of the pivot table. An edge specifies an aggregation of the original data. For example, in FIG. 2, the original data may be in terms of monthly sales figures, but row edge 220 specifies a rollup/aggregation into yearly sales figures.

FIG. 2 illustrates a sales pivot table displaying data values for sales in units in data body 240, a geography data layer on column edge 210, and year and product data layers on row edge 220. Page edge 230 is a pivot filter bar that filters the sales channel to be displayed between "direct" and "indirect" sales. Row 250 displays the aggregated data across years. While ADF is used in this embodiment, it is understood that other technologies capable of visually displaying tables may be used.

FIG. 3 is a screenshot 300 of comma separated value ("CSV") file data according to an embodiment of the present invention. The CSV file contains columns for year 310, product 320, channel 330, geography 340, sales 350 and units 360. A GUI application, such as one with an interface similar to the screenshot depicted in FIG. 2, may then parse these values and apply user-defined settings to display at least some of the values in a pivot table. While a CSV file is used here, it is understood that other separators than commas and other data storage formats may be used.

When a pivot table, such as the pivot table illustrated in FIG. 2, is created, a page definition file may be updated with the required bindings. Binding rules specify how to lay out the data during its transformation, and whether and how to aggregate, sort, or drill through the data. A pivot table data map may contain the following elements:

<columns>: Defines each column item
<rows>: Defines each row item in the appropriate sequence
<pages>: Defines the items to be included in the pivot filter bar
<aggregatedItems>: Defines the totals and subtotals of items <hierarchies>: Defines the potential drill paths between two items <sorts>: Defines category sorts and the initial sort order of pivot table data Naturally, different element names could be used. An example Extensible Markup Language ("XML") file containing the bindings may be as follows in some embodiments:

```
<PivotTable IterBinding="ptExampleDataIterator" id="ptExampleData"
        xmlns="http://xmlns.oracle.com/adfm/dvt"
        ChangeEventPolicy="ppr">
    <pivotTableDataMap>
        <columns>
            <item value="Geography" itemLabel="Location"/>
            <data aggregateDuplicates="true" defaultAggregateType="SUM">
                <item value="Sales"/>
                <item value="Units" aggregateType="AVERAGE"/>
            </data>
        </columns>
        <rows>
            <item value="Year"/>
        </rows>
        <pages>
            <item value="Channel"/>
        </pages>
        <aggregatedItems>
            <item aggregateLocation="AFTER" aggregateType="SUM"
                value="Geography" aggregateLabel="Total Geography"/>
            <item aggregateLocation="AFTER" aggregateType="SUM"
                value="Year" aggregateLabel="Total Across Years"/>
        </aggregatedItems>
        <drills type="INSERT"/>
        <hierarchies>
            <item value="Year" location="BEFORE">
                <child value="Product" label="Product"/>
            </item>
        </hierarchies>
        <sorts>
            <categorySort item="Channel" direction="DESCENDING"/>
            <categorySort item=Year" direction="ASCENDING"/>
            <qdrSliceSort direction="DESCENDING" edge="rows"
            grouped="true"
                    nullsFirst="true">
                <item name="geography" value="world"/>
        </sorts>
    </pivotTableDataMap>
</pivotTable>
```

Bindings may be created manually or with the aid of a development tool, such as JDeveloper from Oracle Corp.

Figure 4:
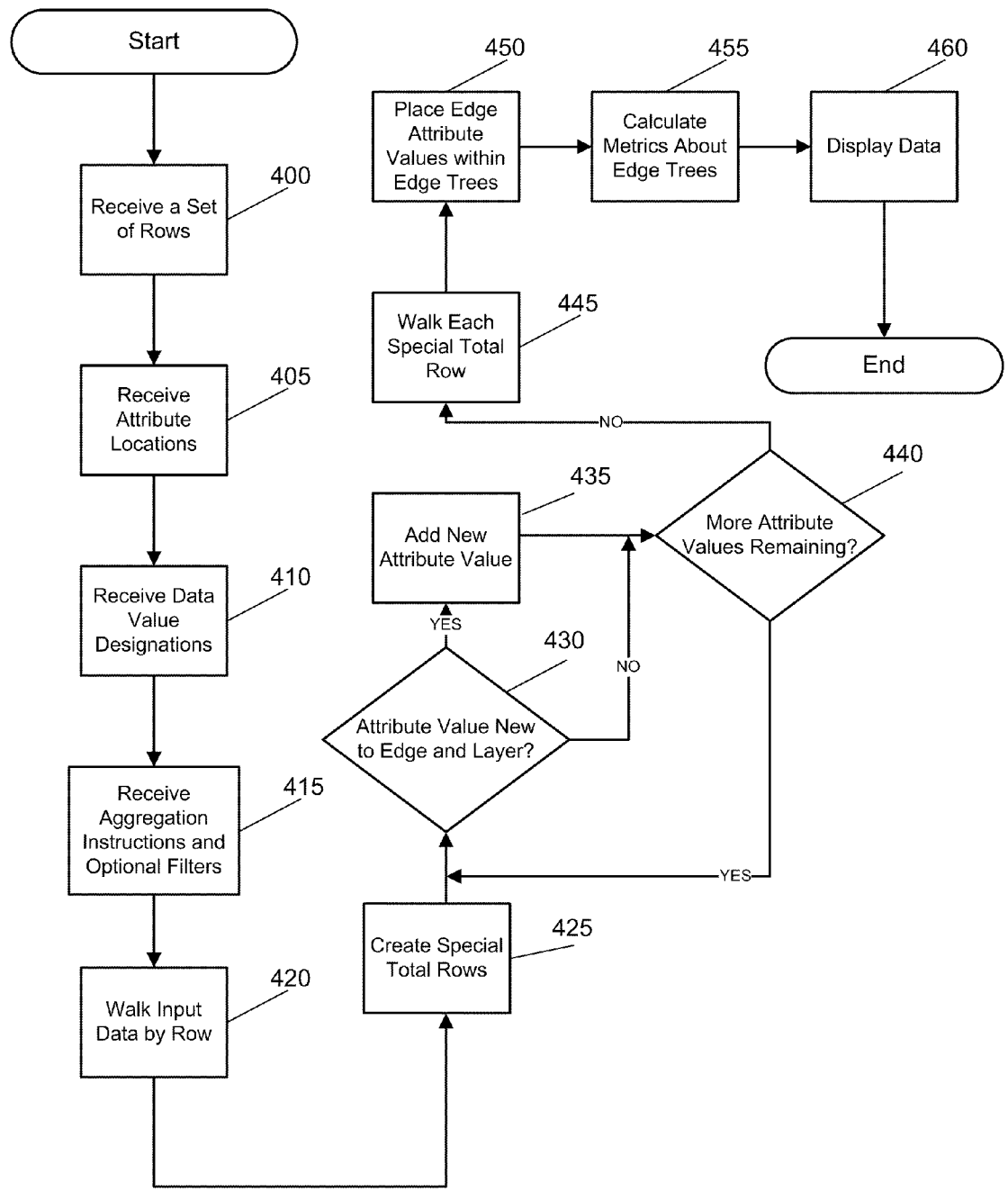
FIG. 4 is a flow diagram illustrating a process flow for performing data table transformation according to an embodiment of the present invention.

FIG. 4 is a flow diagram illustrating a process flow for performing data table transformation according to an embodiment of the present invention that transforms, for example, CSV data of FIG. 3 into the pivot table of FIG. 2. In some embodiments, the functionality of FIG. 4 is implemented by software stored in memory or other computer readable media, and executed by a processor. In other embodiments, the functionality may be performed by hardware (e.g., through the use of an ASIC, a programmable gate array ("PGA"), a field programmable gate array ("FPGA"), etc.), or any combination of hardware and software.

In some embodiments, the process of FIG. 4 may be performed, for example, by computer 100 of FIG. 1 via data table transformer 145. While the process flow is shown in a particular order, it is understood that other orders of execution could occur, such as receiving locations prior to receiving a set of rows. In FIG. 4, the process flow begins with data table transformer 145 receiving a set of rows at 400 as input data. Each row has a set of attributes. Data table transformer 145 then receives locations for at least some of the attributes as zero-based edges (such as the column edge and row edge discussed above with respect to FIG. 2) at 405.

The locations may indicate slowest-to-fastest varying layers within the edge. For example, the slowest-varying layer is the highest level in an edge and would constitute the root of an edge tree. Each level of children below the root is a progressively faster varying layer until reaching the leaves of the tree (deepest and last values), which would be the fastest varying layer. For instance, "year" may be the root at level 0, "month" may be a child of "year" at level 1 and "day" may be a leaf, and child of "month", at level 2. Zero or more of the remaining attributes may be designated as data values ("facts") and may appear at the intersection of the edge attributes from the same row in the input data.

Zero-based edges in one embodiment are the enumeration and order of the data file attributes used by the transformation to organize the multi-dimensional results. Layers relate to the tree depth within each edge, in that the zeroth (or first) layer is the slowest varying, and the nth (or last) layer is the fastest varying. For example, for the layers in the row edge in the results of Table 2 above:

Attr2->Attr1

Attr2 is the zeroth layer in the row edge, and is the parent of the Attr1, first layer in the row edge. Attr2 is the slowest varying layer and Attr1 is the fastest varying layer. In terms of the values of Attr2 and Attr1, X is a parent to values also indexed by B and A, as is Y, because there are rows with those combinations—X & A, X & B, Y & B, etc., in the original data set. It is possible that Y may only be a parent to B for example, if there were no row containing both Y & A in the original data set.

A designation of zero or more of the remaining attributes as "data values" (i.e., facts) is received at 410. Per the above, the data values ultimately appear at the intersection of the edge attributes from the same row in the input data. Data table transformer 145 then receives aggregation instructions, including a list of edge attributes and data value/aggregation type pairs (such as sum, average, count, and the like), and optional filters at 415. The optional filters may indicate which aggregates should display the constituent edge attributes and which should not. Data received by data table transformer 145 may be from a user, a file, another software application, or any other suitable data source, and the data may be provided by the same computer or remotely.

Once the above data and specifications have been received, data table transformer 145 walks the input data by row at 420. If aggregates were specified, as in FIG. 4, special "total rows" are created and the data values thereof are accumulated according to the aggregation instructions at 425.

For each edge attribute, data table transformer 145 distributes the value to a tree (such as an n-way tree) created for each zero-based edge location at 430. An n-way tree is a tree where each node can have up to n children, where n is an integer. For each row, and for each attribute within that row, if the value is new to that attribute's edge and layer (as specified at 405), then the new value is added at 435 as a child of the next slower-varying edge attribute value within the same edge. However, if the value already exists at 430, the value is ignored. If more attribute values or rows remain at 440, the process again proceeds to 430. The tree building process is effectively two loops: one over the original data rows (and previously created aggregate rows, if any) and, within each row, a loop to handle each attribute for which placement was specified at 405.

Data values found within each row may be stored using a multiple edge attribute/value pair hash table. In one embodiment, the hash table consists of entries linking keys representing the intersection of the edges' attribute values with the data value to be displayed at that intersection. In the results of Table 2 above, for example, one of the key/value pairs (representing the value/intersection for the value "8" in the data body) would be:

Key: Attr3="M", dataVal="Val2", Attr2="Y", Attr1="B"
        Value: 8

Data table transformer 145 then walks the special total rows at 445 and places the edge attribute values thereof within the edge trees either before or after the constituent edge attributes, depending on design choice, at 450. Whether constituent edge values are to be shown or hidden is also noted. Data table transformer 145 may either calculate metrics about the edge trees as the trees are built as shown at 455, or upon request by a consuming software application. The number of children of a particular edge attribute, and the total number of data rows or columns represented by a particular edge attribute (referred to as "total edge extent") are some non-limiting examples of potential metrics. As an example of total edge extent, in the results of Table 2 above, the column edge extent is 2 and the row edge extent is 6 (as the resulting grid of data is 2×6). A GUI software application consuming the results generated by data table transformer 145 then uses an API that is highly tuned to the display of multi-dimensional, cross-tabular edges and data to display the results graphically at 460. Implementing such an API enables a developer to make use of the edge trees and edge attribute/value pair hash tables to return values, metrics about edges and data cell values to the consuming GUI software application.

In some embodiments, a data table transformer may prepare table data to be presented in a multi-dimensional, or cross-tabular, format. Trees, such as n-way trees, are generated for each zero-based edge to organize the data for multi-dimensional display based on a desired visual appearance and functionality. Rows and columns of data have "layers" that can be expanded and collapsed, based on the GUI, to "drill down" to view more detailed layers. Such an implementation may allow a user application, rather than a server-side or database application, to choose which data to present and how the data should be presented to the user.

As disclosed, data table transformer 145 combines conversion of standard relational tables into multi-dimensional formats that are easy for views to consume, and at the same time optionally calculates and places aggregates whose children can be displayed or hidden. This provides a straightforward way of rolling up, displaying and analyzing detailed relational data in a compact, summarized form. In addition, embodiments can do this for any data in a standard "row set" form consisting of defined attributes as columns and data across those columns as rows. This data can be from a data warehouse, a simple comma separated text file, or a web service feed, for example. This is a powerful capability useful in analyzing sales and financial data, among many other applications.

While the term "computer" has been used in the description of some embodiments of the present invention, the invention may be applied to many types of network computing devices. For purposes of this invention, the term "computer" includes rack computing systems, cloud computing systems, distributed computing systems, personal computers, laptops, cell phones, personal digital assistants, tablet computing devices, mainframes, any networked devices that perform computing operations, and the like.

One having ordinary skill in the art will readily understand that the invention as discussed above may be practiced in a different order, and/or with hardware elements in configurations that are different than those that are disclosed. Therefore, although the invention has been described based upon these preferred embodiments, it would be apparent to, and readily appreciated by, those of ordinary skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

What is claimed is:

1. A non-transitory computer-readable medium having instructions stored thereon that, when executed by a processor, cause the processor to transform input data into pivot table data, the transforming comprising:
    receive the input data comprised of attributes as columns and data across the columns as rows, wherein the input data is received in a delimiter-separated value file format;
    receive locations for at least some of the attributes as zero-based edges, wherein layers of the edges are presented from the slowest to the fastest varying layers;
    receive a designation of data values that appear at intersections of edge attributes from the same row;
    receive aggregation instructions comprising a list of edge attributes and data value/aggregation type pairs;
    for each of the zero-based edges, create an edge tree;
    walk the input data by row, and, for each edge attribute, distribute the value of the edge attribute to the edge tree created for each zero-based edge location;
    store data for each row in a multiple edge attribute/value pair hash table, the hash table including a plurality of key/data value pairs representing intersections of edge attribute values with the data value to be displayed at each intersection, each key including a plurality of edge attribute values;
    in response to the aggregation instructions, create special total rows;
    walk the special total rows and place special edge attribute values before or after the value of the edge attribute on the tree; and
    display the data in a pivot table based on the edge tree and the hash table, the pivot table including a data body having a plurality of data value cells, a column edge, a row edge and a page edge having a pivot filter bar to filter the data displayed in the pivot table based on data not displayed in the pivot table.

2. The non-transitory computer-readable medium of claim 1, wherein, when the attribute value is new to the edge and layer, the attribute value is added as a child of a next slower-varying edge attribute within the same edge and when the attribute value exists, the attribute value is ignored.

3. The non-transitory computer-readable medium of claim 1, the transforming further comprising:
accumulate data values according to an aggregate specification.

4. The non-transitory computer-readable medium of claim 3, the transforming further comprising:
receive one or more filters indicating which aggregates should display constituent edge attributes and which should not.

5. The non-transitory computer-readable medium of claim 1, the transforming further comprising:
calculate metrics about the edge trees either as the trees are built or as the metrics are requested by a consuming Graphical User Interface application.

6. The non-transitory computer-readable medium of claim 5, wherein the calculates metrics comprise at least one of a total edge extent, a number of children of a particular edge attribute, a total number of data rows represented by a particular edge attribute, or a total number of data columns represented by a particular data attribute.

7. The non-transitory computer-readable medium of claim 1, wherein the aggregation type includes sum, average or count.

8. A data table transformation system comprising a processor programmed to perform as a data table transformer module configured to:
receive the input data comprised of attributes as columns and data across the columns as rows, wherein the input data is received in a delimiter-separated value file format;
receive locations for at least some of the attributes as zero-based edges, wherein layers of the edges are presented from the slowest to the fastest varying layers, and
receive a designation of data values that appear at intersections of edge attributes from the same row;
receive aggregation instructions comprising a list of edge attributes and data value/aggregation type pairs;
for each of the zero-based edges, create an edge tree;
walk the input data by row, and, for each edge attribute, distribute the value of the edge attribute to the edge tree created for each zero-based edge location;
store data for each row in a multiple edge attribute/value pair hash table, the hash table including a plurality of key/data value pairs representing intersections of edge attribute values with the data value to be displayed at each intersection, each key including a plurality of edge attribute values;
in response to the aggregation instructions, create special total rows;
walk the special total rows and place special edge attribute values before or after the value of the edge attribute on the tree; and
display the data in a pivot table based on the edge tree and the hash table, the pivot table including a data body having a plurality of data value cells, a column edge, a row edge and a page edge having a pivot filter bar to filter the data displayed in the pivot table based on data not displayed in the pivot table.

9. The system of claim 8, wherein, when the attribute value is new to the edge and layer, the tree generation module is configured to add the attribute value as a child of a next slower-varying edge attribute within the same edge and when the attribute value exists, the tree generation module is configured to ignore the attribute value.

10. The system of claim 8, wherein the tree generation module is further configured to accumulate data values according to an aggregate specification.

11. The system of claim 8, further comprising:
a calculating module configured to calculate metrics about the edge trees either as the trees are built or as the metrics are requested by a consuming Graphical User Interface application.

12. The system of claim 8, the data receiving module further configured to receive one or more filters indicating which aggregates should display constituent edge attributes and which should not.

13. The system of claim 8, wherein the aggregation type includes sum, average or count.

14. A computer-implemented method for transforming data tables, comprising:
receiving the input data comprised of attributes as columns and data across the columns as rows, wherein the input data is received in a delimiter-separated value file format;
receiving locations for at least some of the attributes as zero-based edges, wherein layers of the edges are presented from the slowest to the fastest varying layers;
receiving a designation of data values that appear at intersections of edge attributes from the same row;
receiving aggregation instructions comprising a list of edge attributes and data value/aggregation type pairs;
for each of the zero-based edges, creating an n-way edge tree;
walking the input data by row, and, for each edge attribute, distributing the value of the edge attribute to the n-way edge tree created for each zero-based edge location;
storing data for each row in a multiple edge attribute/value pair hash table, the hash table including a plurality of key/data value pairs representing intersections of edge attribute values with the data value to be displayed at each intersection, each key including a plurality of edge attribute values;
in response to the aggregation instructions, creating special total rows;
walking the special total rows and placing special edge attribute values before or after the value of the edge attribute on the tree; and
displaying the data in a pivot table based on the n-way edge tree and the hash table, the pivot table including a data body having a plurality of data value cells, a column edge, a row edge and a page edge having a pivot filter bar to filter the data displayed in the pivot table based on data not displayed in the pivot table.

15. The computer-implemented method of claim 14, wherein, when the attribute value is new to the edge and layer, the attribute value is added as a child of a next slower-varying edge attribute within the same edge and when the attribute value exists, the attribute value is ignored.

16. The computer-implemented method of claim 14, further comprising:
accumulating data values according to an aggregate specification.

17. The computer-implemented method of claim 14, further comprising:
calculating metrics about the edge trees either as the trees are built or as the metrics are requested by a consuming Graphical User Interface application.

18. The method of claim 14, further comprising receiving one or more filters indicating which aggregates should display constituent edge attributes and which should not.

19. The method of claim 14, wherein the aggregation type includes sum, average or count.

* * * * *

UNITED STATES PATENT AND TRADEMARK OFFICE
CERTIFICATE OF CORRECTION

PATENT NO. : 9,146,916 B2  
APPLICATION NO. : 12/686792  
DATED : September 29, 2015  
INVENTOR(S) : Moroze Page 1 of 1

It is certified that error appears in the above-identified patent and that said Letters Patent is hereby corrected as shown below:

On title page 2, item [56], column 1, line 5, delete "Retrived:" and insert -- Retrieved: --, therefor.

In the specification

Column 1, line 6, delete "No.61/256,418," and insert -- No. 61/256,418, --, therefor.

Signed and Sealed this  
Thirty-first Day of May, 2016

Michelle K. Lee  
*Director of the United States Patent and Trademark Office*